United States Patent [19]
Ying

[11] Patent Number: 6,037,862
[45] Date of Patent: Mar. 14, 2000

[54] AUTOMOBILE OVERSPEED WARNING SYSTEM

[76] Inventor: Gary Ka-Chein Ying, 191 York Mills Road, Toronto, Ontario, Canada, M2L 1K8

[21] Appl. No.: 09/275,966

[22] Filed: Mar. 25, 1999

Related U.S. Application Data

[63] Continuation-in-part of application No. 09/123,392, Jul. 21, 1998.

[51] Int. Cl.[7] .................................................. B60Q 1/00
[52] U.S. Cl. ......................... 340/441; 340/438; 340/461; 340/462
[58] Field of Search .................................... 340/439, 441, 340/459, 461, 462, 576, 670, 332, 438

[56] References Cited

U.S. PATENT DOCUMENTS

| | | | |
|---|---|---|---|
| 5,265,468 | 11/1993 | Holst et al. ............................. | 73/118.1 |
| 5,554,970 | 9/1996 | Mottahedeh ............................ | 340/441 |
| 5,568,797 | 10/1996 | Landerretche .......................... | 123/396 |
| 5,636,145 | 6/1997 | Gorman et al. ...................... | 340/441 X |
| 5,659,290 | 8/1997 | Haeri ...................................... | 340/441 |

*Primary Examiner*—Daryl Pope
*Attorney, Agent, or Firm*—Blake, Cassels & Graydon LLP

[57] ABSTRACT

An automobile overspeed warning system includes speed sensors for sensing the rate at which an automobile is travelling and speed selectors for receiving an input from the automobile driver indicating a top speed which the driver seeks not to exceed. The overspeed warning system compares the two values and activates an alarm when the desired limit is exceeded. The system can be used in conjunction with an existing cruise control system as a back-up system to warn the driver that the cruise control system has not been reset, or it can be used independently of a cruise control system to prevent the driver of an automobile from unknowingly or inadvertently operating his or her vehicle in excess of a certain speed for safety or other reasons. The system can be provided as a retrofit kit or as an integral part of an existing micro-processor controlled electrical system within the automobile.

13 Claims, 7 Drawing Sheets

Note1 : Subroutine Entry - as often as system allows

Note2 : initial values STATUS = INACTIVE , LED = OFF , DISPLAY = BLANK
LIMIT = 100 Km/h Note3 : pressing KNOB to release = OUT (Warning ACTIVE)
pressing KNOB again to store = IN (Warning INACTIVE)

Note4 : turning KNOB - CW = increase limit - CCW = decrease limit

ELECTRONIC SPEED WARNING SYSTEM FLOWCHART
ELABORATE - INTEGRATED VERSION

ELECTRONIC SPEED WARNING SYSTEM
ELECTRONIC BLOCK DIAGRAM
SIMPLE-STANDALONE VERSION: SPEED WARNING BUTTONS

Note : initial values
   STATUS = INACTIVE , ILLUMINATION = OFF
   LIMIT    = 100 Km/h ELECTRONIC SPEED WARNING SYSTEM FLOWCHART
SIMPLE- STANDALONE VERSION: SPEED WARNING BUTTONS ELECTRONIC SPEED WARNING SYSTEM
ELECTRONIC BLOCK DIAGRAM
SIMPLE-INTEGRATED VERSION: SPEED WARNING BUTTONS Note1 : Subroutine Entry - as often as system allows Note2 : initial values  STATUS = INACTIVE , ILLUMINATION = OFF
LIMIT = 100 Km/h ELECTRONIC SPEED WARNING SYSTEM FLOWCHART
SIMPLE-INTEGRATED VERSION: SPEED WARNING BUTTONS

| 84 | DEFINED BY PREEXISTING ELECTRONIC SYSTEM CONTROLS<br>- WARNING LIGHTS<br>- SEAT BELT BUZZER<br>- ENGINE CONTROLS, ETC. |

| 86 | DEFINED BY PREEXISTING ELECTRONIC SYSTEM SENSORS<br>- DOOR SWITCHES<br>- TACHOMETER<br>- WHEEL SENSORS, ETC. |

ELECTRONIC SPEED WARNING SYSTEM
ELECTRONIC BLOCK DIAGRAM
ELABORATE-INTEGRATED VERSION:
SPEED WARNING KNOB & DISPLAY

# AUTOMOBILE OVERSPEED WARNING SYSTEM

This application is a continuation-in-part of U.S. Patent application Ser. No. 09/123,392, filed Jul. 21, 1998.

FIELD OF THE INVENTION

The present invention relates to an overspeed warning system for an automobile.

BACKGROUND OF THE INVENTION

When driving a car, it is often desired to maintain a certain rate of speed, and yet not to exceed that speed. This is a popular feature, and is commercially available in cars which have a cruise control feature. Cruise control has a number of disadvantages. Cruise control is not useful in city streets where the traffic is slow, and often accompanied by frequent stops, and the posted speed limits are low. Cruise control is not practical on busy highways where the traffic is heavy and the general speed of the traffic may fluctuate from relatively high speeds to very low speeds, or stopped conditions. Cruise control is not recommended on winding roads where it is not safe to drive at a steady speed. Cruise control is not effective on hills where maintaining a steady speed requires the application of the accelerator or the brake. Cruise control can be dangerous on slippery roads where fast changes in tire traction can cause needless wheel spinning, and a possible loss of control of the vehicle. At least one known type of cruise control automatically shuts off when the brake is applied and automatically disengages when the optional traction control system begins to limit wheel spin. The driver of the vehicle may forget to restart the cruise control afterwards when resuming a high rate of speed, such that the car may exceed the desired cruising speed without the driver being aware of it. A driver who forgets or is unaware that the cruise control has ceased to function may find benefit in having an overspeed set at a speed beyond the desired cruise control speed, to act as a back-up system.

Whether or not a car has cruise control, a driver can benefit from an automobile overspeed warning system. The primary purpose of an automobile overspeed warning system is to prevent the driver of an automobile from unknowingly or inadvertently operating his or her vehicle in excess of a certain speed limit for safety or other reasons. This enables the driver to concentrate on the challenges of driving, rather than being distracted by constantly monitoring or watching over the speed of his or her vehicle. The driver of the vehicle may be motivated by a desire or need to remain within the posted speed limit, or by a concern or worry for safety under given road or weather conditions. An automobile overspeed warning system reminds or warns the driver that it is not safe, or lawful, to operate his or her vehicle in excess of a certain speed limit in certain circumstances, whether those circumstances are due to mechanical, environmental or legal constraints. An automobile overspeed warning system can provide drivers of automobiles with valuable peace-of-mind.

In an automobile overspeed warning system, the driver of the vehicle can set or select a speed limit anytime, and when the speed of his or her vehicle exceeds that speed limit, a warning to the driver will follow.

When a person is driving, an unduly harsh warning may be startling, and may cause an involuntary reaction that could be dangerous to the driver and to others. For that reason a loud or shrill warning would not be the best solution to the problem. It would be preferable to provide a warning in a gentle, or calming voice, or to use soothing music as a warning that is clearly perceptible to the driver, and yet unlikely to be startling. A driver receiving such a warning can consider the speed of the car carefully and make appropriate changes without undue abruptness.

It would also be advantageous to have an overspeed warning system available in a kit form that can be retro-fit on existing automobiles. To that end, whether the warning system is entirely electrical, entirely mechanical, or some combination of electrical and mechanical components, it would be advantageous to be able to install those components on existing automobile hardware without having to undertake an unreasonable, or uneconomic, amount of work.

Accordingly, there is a need for a relatively simple overspeed warning system that can be used independently of a cruise control system.

SUMMARY OF THE INVENTION

According to a broad aspect of the invention there is an automobile overspeed warning system for a passenger car. It comprises a speed sensor for sensing the speed of the automobile; a speed selector on which an operator may select a desired speed; a comparator for comparing the speed sensed by the sensor with the speed selected with the selector; and a warning annunciator connected to the comparator. The annunciator is connected to annunciate a warning when the speed sensed exceeds the speed selected.

In an additional feature of this aspect of the invention, the annunciator includes at least one of (a) a voice message generator; (b) a musical message generator; and (c) a flashing light. In a further additional feature of that aspect of that invention, the speed sensor is chosen from the set of speed sensors positioned (a) to measure speed from the speedometer of the car; (b) to measure the rate of rotation of a drive shaft of the car; and (c) to measure the rate of rotation of a wheel of the car. In a further additional feature of that aspect of the invention, the selector includes a knob by which the selected speed can be changed while the car is in motion.

In a still further additional feature of that aspect of the invention, the speed sensor is a magnetic sensor; the comparator includes a micro-processor; and the annunciator includes a loud speaker. In a yet further additional feature of that aspect of the invention, the overspeed warning system is in the form of a retro-fit kit. Further again, in another additional feature of the invention, the overspeed warning system is combined with a cruise control system. The warning system is operable at a selected speed higher than the cruise control speed.

In another further additional feature of that aspect of the invention, the warning system includes a display for indicating when the warning system is "on". In yet another additional feature of that aspect of the invention the speed selector includes a knob movable to an "on" position, and the display includes an illumination element for illuminating the knob that is lit when the knob is in the "on" position. In another alternative additional feature of that aspect of the invention, the comparator comprises a microprocessor connected to sample input signals from the speed sensor and from the speed selector. The microprocessor is provided with software for comparing these input signals, and is connected to provide an output signal to the annunciator.

In another aspect of the invention, there is a method of providing an overspeed warning to an automobile driver. That method comprises the steps of providing a speed selector; selecting a speed on the speed selector sensing the vehicle speed; comparing the vehicle speed with the selected speed; and annunciating a warning to the driver when the vehicle speed exceeds the selected speed.

In an additional feature of this other aspect of the invention, the method includes the steps of providing a cruise control system and selecting a cruise control speed. In a further additional feature of that additional feature, the step of selecting a speed on the speed selector includes selecting a higher speed on said speed selector than the cruise control speed.

In a further additional feature of that aspect of the invention, the step of sensing includes one of (a) obtaining a speed signal from the speedometer of the automobile; (b) measuring the rate of rotation of the drive shaft; and (c) measuring the rate of rotation of the wheels of the automobile. In a still further additional feature of that aspect of the method includes using a programmable micro-processor to compare the vehicle speed and the selected speed.

In a yet further feature of that aspect of the invention, the step of annunciating includes at least one of (a) playing a recorded message; (b) playing a recorded piece of music; (c) playing a synthesized voice message; (d) playing a synthesized musical message; and (e) illuminating a light. In a still further additional feature of that aspect of the invention the method includes illuminating a display to indicate to the car driver that the system is "on".

BRIEF DESCRIPTION OF THE DRAWINGS

For purposes of illustration, but not of limitation, to yield a better understanding of the present invention and to show more clearly how it may be carried into effect, reference will now be made by way of example to the accompanying drawings, which show an apparatus according to the preferred embodiment of the present invention, and some alternative embodiments thereto, and in which.

DETAILED DESCRIPTION OF THE PREFERRED EMBODIMENT

The description of the invention is best understood by commencing with reference to an embodiment, or embodiments, of the invention as shown in examples illustrated in the Figures. These examples are given to facilitate explanation of the invention. The invention is not limited to the specific embodiments illustrated. Some proportions may have been exaggerated for the purposes of conceptual illustration.

Figure 1:
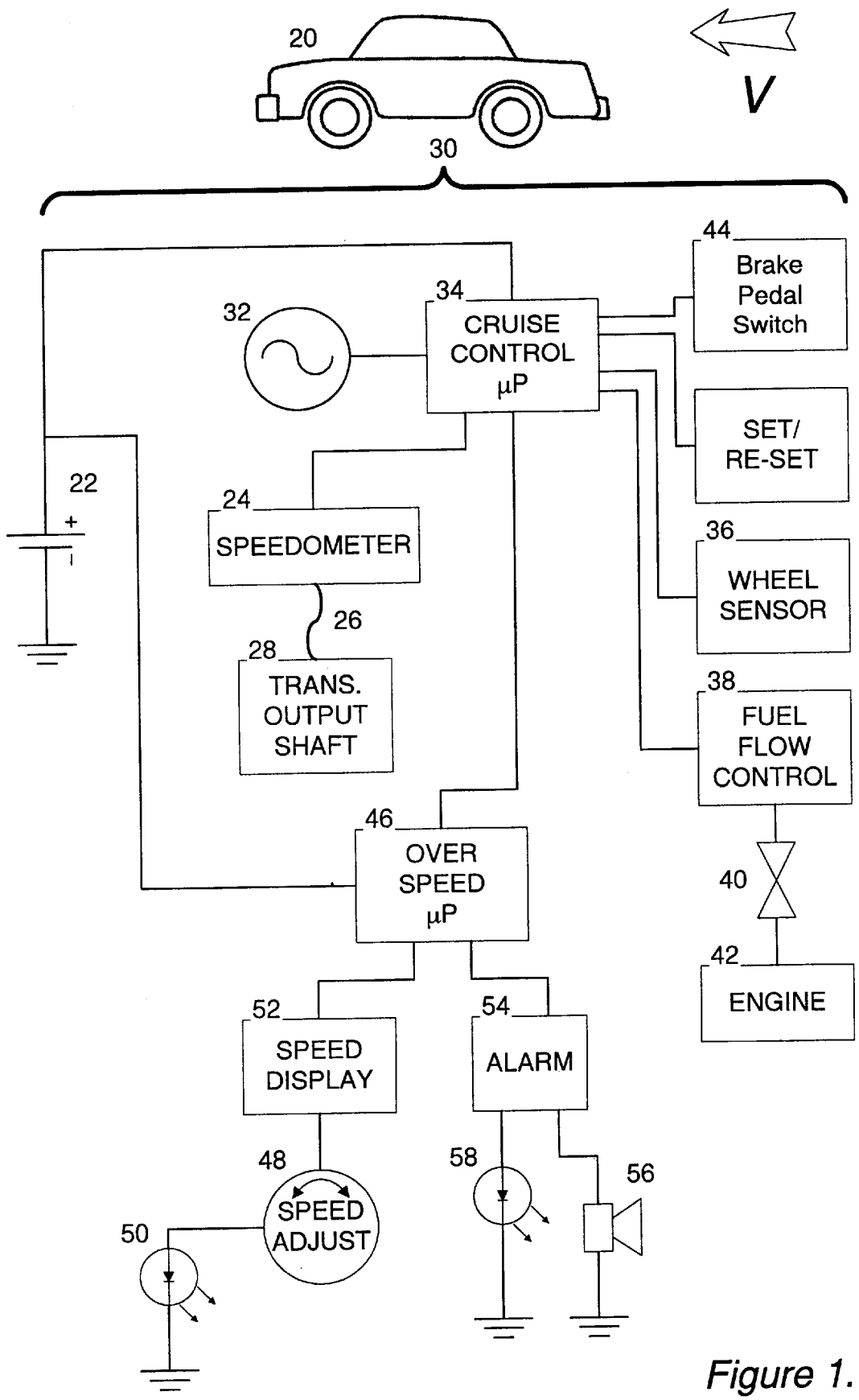
FIG. 1 is a general schematic drawing setting out the conceptual elements of an example of an overspeed warning system embodying the principles of the present invention.

Referring first to FIG. 1, a car is shown generally as 20. It proceeds along a road at a given speed, V. It has a standard 12 Volt D.C. electrical power supply system 22 that powers all the electrical components of the vehicle, whether lights, starter, wiper motors, fans, or electronic engine control logic microprocessors. Car 20 has a speedometer 24 and a speedometer cable 26. Cable 26 is mechanically connected to monitor the speed of car 20, whether by measuring the speed of the output shaft from the transmission 28, the rate at which the wheels turn, or some other suitable indicator. The rate at which the output shaft turns is a convenient measure. It is a fixed multiple of the rate at which the wheels turn, and hence is directly proportional to the speed of the car. Both mechanical and electronic speedometer systems are available.

Car 20 is also shown with a cruise control system 30, although an overspeed warning system can also be applied to cars that do not have cruise control. Cruise control system 30 is connected to electrical system 22, and includes a clock signal generator 32 and a cruise control microprocessor 34. It receives a speed input signal either from speedometer 24, speedometer cable 26, from a wheel sensor 36, or from some other suitable device, and transmits an output signal to drive a fuel flow control 38 for controlling fuel flow through a fuel pump 40 to engine 42. Cruise control system 30 need not depend on any elements of the speedometer, whether mechanical or electrical, and could be a completely independent system. Cruise control system 30 is set by operating car 20 at a desired speed, that is, the cruise control speed, and then signalling to cruise control microprocessor 34 to record in memory the setting at that desired speed as a reference. Cruise control microprocessor 34 also receives an interrupt signal from a brake pedal switch 44. When the brake is operated cruise control system 30 is interrupted and becomes inactive. Once the driver has ceased to brake he or she may then input a resume signal to cruise control microprocessor 34 to cause cruise control system 30 to operate actively again. In due course the speed sensed will match the referenced signal in memory.

As shown in FIG. 1, in one embodiment of the invention the overspeed warning system includes an overspeed warning microprocessor 46. It receives power from power supply system 22 and receives a timing signal from clock signal generator 32. Alternatively, an independent clock signal generator could also be used. Overspeed warning microprocessor 46 receives input signals either directly, or indirectly as, for example, through cruise control microprocessor 34. One input is a speed measurement, either from the output shaft of the transmission, 28, wheel sensor 36, or speedometer 24.

The system also requires that a speed selection be made by the driver. The speed selected can be displayed so that the driver can know, or confirm, that the speed selection is correct initially, and current thereafter. Overspeed warning microprocessor 46 receives two types of input from a speed selection knob 48. The first input is an "On" or "Off" signal to activate or deactivate the system generally. For example, the "On" "Off" function can correspond to a spring loaded button in either "Out" or "In" positions. In the preferred embodiment knob 48 is translatable, as by pressing or releasing from a spring load, along an axis of knob 48, between the "On" and "Off" positions, and is rotatable about its axis to select a specific speed. Such a spring loaded button, or switch, need not provide a signal to overspeed warning microprocessor 46, but could act as a switch in either the power (or ground) connection to overspeed warning microprocessor 46. Similarly, knob 48 can alternatively be illuminated by a lighting element 50 when activated, the illumination being automatically shut off when car 20 is not in operation. Knob 48 is mounted in a convenient location that can be reached by the driver during operation of car 20. The preferred location is on the dashboard of the car adjacent to the speedometer display. It could, alternatively, be located on the steering column in a position similar to that of a turn signal indicator or windshield-wiper control arm. Further still, some vehicles have a lower central dashboard console that is used to house heating and cooling controls or a radio, CD player or tape player, or both heating and cooling controls and radio and musical entertainment devices. Another alternative mounting location is in this console, or dashboard region. Further again, a number of cars have a gear shift console located on a raised portion of the floor pan lying along the longitudinal centerline of the car. An overspeed warning system control could also be mounted in this region.

The second function of speed selection knob 48 is to permit the driver to select a desired overspeed limit value. Once in the "On" position, this selection is made by turning knob 48 clockwise or counter-clockwise to obtain the desired value. The rotation of knob 48 may operate a mechanical linkage, a rheostat, or an analogous device to provide an analogue signal. This signal can be converted to a digital form and shown on a display 52, preferably an LED, but possibly an LCD or even by a mechanical linkage and gear type display mounted in sight of the driver, typically on the driver's console, not far from the speedometer. In the event that the system is electronic, an initial default setting, such as 100 km/h can be programmed in and displayed when the system is turned "On" by pushing knob 48 to its "Out" position. Alternatively, the most recently chosen setting can be stored in memory, and can be displayed when the system is re-activated.

An output port of overspeed warning microprocessor 46 is connected to activate a warning annunciator in the nature of an alarm circuit 54 having an audible speaker 56 and a visible signal, such as a flashing light 58. Audible speaker 56 can be an existing audible warning device in the car such as a door or seat-belt warning buzzer. For example, a high voltage output from overspeed warning microprocessor 46 can be used by alarm circuit 54 to drive a relay driven switch in which power is applied to the positive side of speaker 56 and flashing light 58. A number of possible alternative configurations can be chosen. It is not necessary to have both audible and visual signals, and if one is chosen, it is preferred that an audible signal be provided. It is preferred that the audible signal not be unduly harsh. For that reason, rather than use a buzzer, a synthesized voice signal, or musical signal, can be amplified and directed to speaker 56 instead. Alarm circuit 54 may alternatively include a tape recorded message, possibly on a loop, or a tape recorded piece of music.

The embodiment described can be supplied in a "stand-alone" configuration as a kit available from an automotive supply store for retro-fit to an existing vehicle. It may be that car 20 is of such a vintage that it lacks an existing microprocessor that can be adapted for this additional purpose, or it may be that the existing microprocessor cannot be re-programmed. In that case a stand alone microprocessor can be provided, along with suitable elements for sensing and interpreting automobile speed, whether as original equipment or as a retro-fit kit. In the case of a retro-fit kit, although a predominantly electronic system is preferred, it is possible to construct a system of largely mechanical elements for controlling an audible alarm.

Such a stand-alone kit may entail duplication of elements already existing within the electrical system of car 20. Whether a stand-alone kit is used, or the system is supplied as a factory installation, some duplication can be avoided by using elements of the existing design of the car. In the most preferred embodiment, an existing microprocessor in car 20, such as cruise control microprocessor 34, that is provided to perform one or several other functions, is merely provided with an additional software package containing programming steps to perform the logic operations set out in the algorithm of FIG. 2, and such additional memory space, as may be required. This would obviate the need for a second, separate microprocessor such as microprocessor 46. Similarly, the use of an existing alarm buzzer or speaker has been noted above. The use of a loudspeaker of an existing audio system of the car, such as an existing speaker of a radio, CD player, or cassette player permits a relatively high quality sound to be used, rather than a harsh buzzer. For example, it permits a voice message or musical message of the same tone and quality as FM radio. When provided with a voice recording function, the system can play a pre-recorded message of the operator's choosing, or a piece of music of the operator's choosing, or some combination of a voice message and music, whether sequentially or overlaid on top of each other to produce a soothing effect.

It is assumed that the existing cruise control system 30 already has a calibrated electronic measurement from which speed can be inferred, whether in analogue or digital form. If in digital form, the signal can be used directly. If in analogue form, an A-D converter may be required. In any case, this existing speed signal can be used by the additional overspeed warning software. Where existing circuitry can be used, only a device for setting an overspeed limit, such as knob 48 and a display such as display 52, are required.

Figure 2:
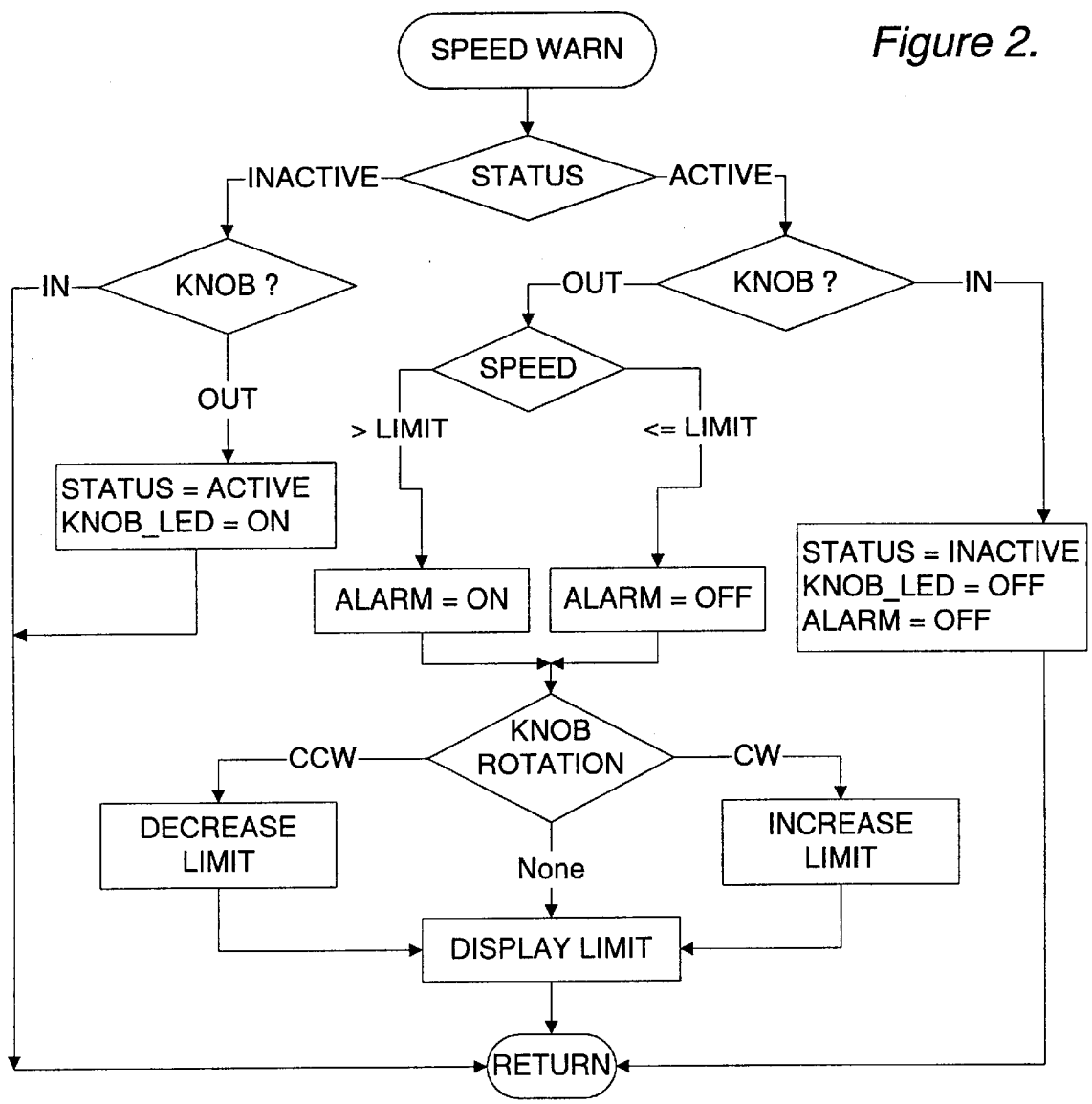
FIG. 2 is an example of an algorithm by which the overspeed warning system of FIG. 1 operates.
Figure 7:
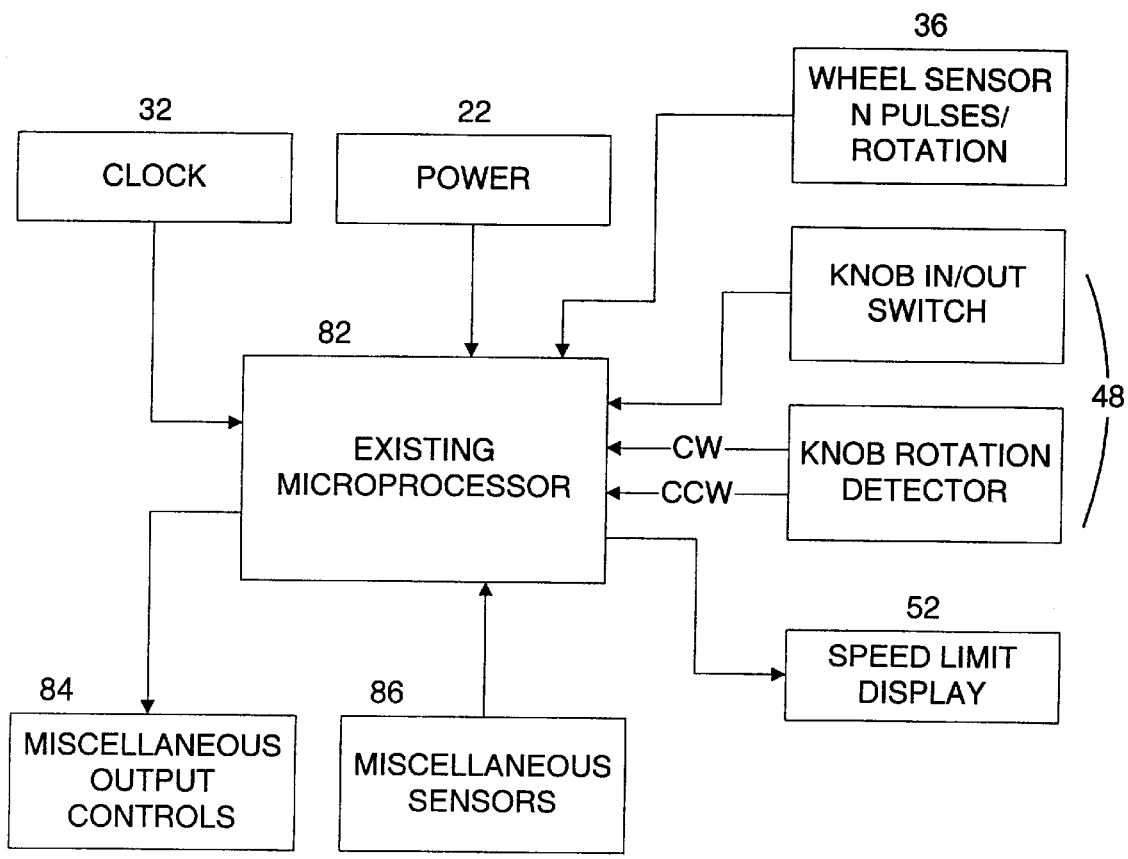
FIG. 7 is an electronic block diagram of the warning system of FIG. 2.

Whether using an existing microprocessor, or a dedicated microprocessor as indicated in FIG. 1, the logic of operation is similar. In a typical electronic system for a car, several functions can be included in a single microprocessor. FIG. 2 shows an "elaborate-integrated" subroutine. FIG. 7 shows the electronic block diagram of the warning system of FIG. 2. The automobile overspeed warning system is an additional subroutine included with the existing microprocessor operating instructions of the electronic car system. Such a system operates on a continuous basis when the engine is running, such that the overspeed warning system is subroutine is called repetitively on a substantially continuous basis, with a time period of, typically, a few milliseconds between repetitions. The system has a status register, or flag, that is used to recall the previous status each time the subroutine is entered. The subroutine returns to the main loop after processing the inputs and adjusting the outputs as required.

Referring to FIG. 2, a "Speed Warn" subroutine starts as indicated at the top of the page. The first "Status" determines whether the system is active or inactive according to the axial position of knob 48 ("In" or "Out", corresponding to "Off" and "On"), and sets the memory register accordingly. If the system is "Inactive" the subroutine continues to "Return" and the system waits for the next cycle. If the system status is "Active" then a further check will be made to see if knob 48 has moved to the "Off" condition. In that case alarm circuit 54 and LED display 52 are set to "Off", and the "Status" register is set to "Inactive". If knob 48 is "Out" and the system status is "Active" then the "Speed" value derived from monitoring, for example, wheel sensor 36, is compared with the "Limit" register value derived from the angular position of knob 48. If the "Limit" value is exceeded then the alarm register will be set to "On" (otherwise to "Off"), resulting in the activation of alarm circuit 54. In the next decision box, the system determines whether knob 48 has moved. If not, then the subroutine proceeds to "Display" and then to "Return". If knob 48 has turned then the value in the "Limit" register will be increased or decreased according to the extent of the clockwise or counter-clockwise rotation of the knob about its axis. In either case the limit value will continue to be displayed. In a stand-alone system this subroutine would run continuously as long as knob 48 remained "On". Notably, the angular setting of knob 48 can be changed at any time. Thus when car 20 turns from one road on to another, and the speed limit or the driving conditions change, another "Limit" value can be selected while car 20 is in motion. Alternatively, the speed selected with knob 48 can be changed while the car is stopped, such as before a journey commences or while at a stop light or stop sign. Then, when the car proceeds out onto the road the warning has already been selected by the driver. Inasmuch as the most recently selected speed is stored in memory, knob 48 can be moved to its "Off" position to deactivate system 20 as the driver may desire, and then moved to its "On" position, in which the system will be re-activated to give a warning at the most recently selected speed.

Whether the system is primarily mechanical or electronic, a retro-fit kit can measure vehicle speed in at least three ways. It can measure the rotational speed of the wheels, typically with a mechanical counting wheel, an optical sensor, or a magnetic or inductive sensor. Such a sensor can be mounted to count wheel rotations directly, or can be mounted to count the number of turns made by the output shaft of the transmission of the car, or may draw a signal directly from an existing speedometer cable. With known vehicle geometry the number of turns per minute of either the output shaft, the wheels, or the speedometer can be converted into actual vehicle speed. For a retro-fit kit, a table of conversion factors for commonly available makes and models of cars could be provided, with the appropriate calibration adjustment factor being entered into memory on installation.

In all embodiments, a successful retro-fit kit can be assembled from a speed measuring sensor, a speed selector, a speed selector display, an alarm, a microprocessor for comparing the actual speed and the selected speed, and appropriate logic circuits or software for performing that comparison function.

Figure 3:
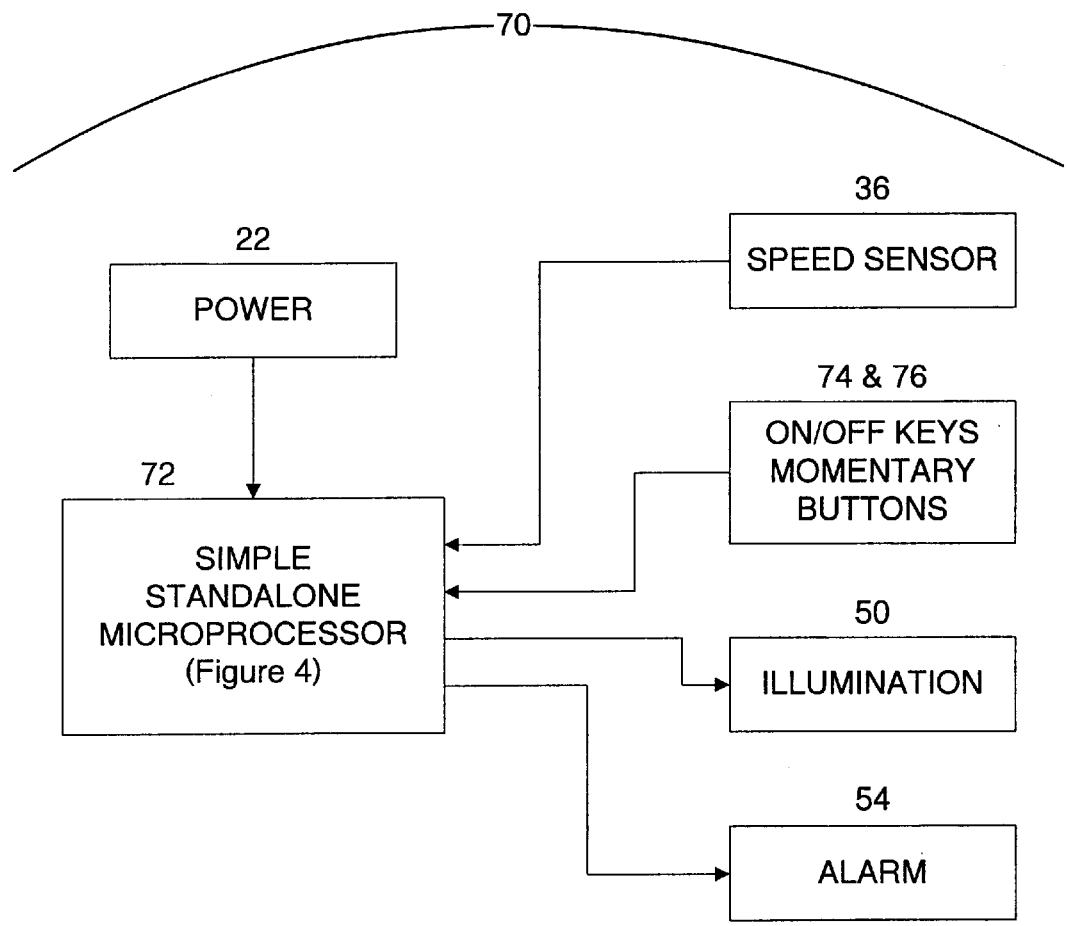
FIG. 3 is an electronic block diagram for an alternative, stand-alone version of the overspeed warning system of FIG. 1.
Figure 4:
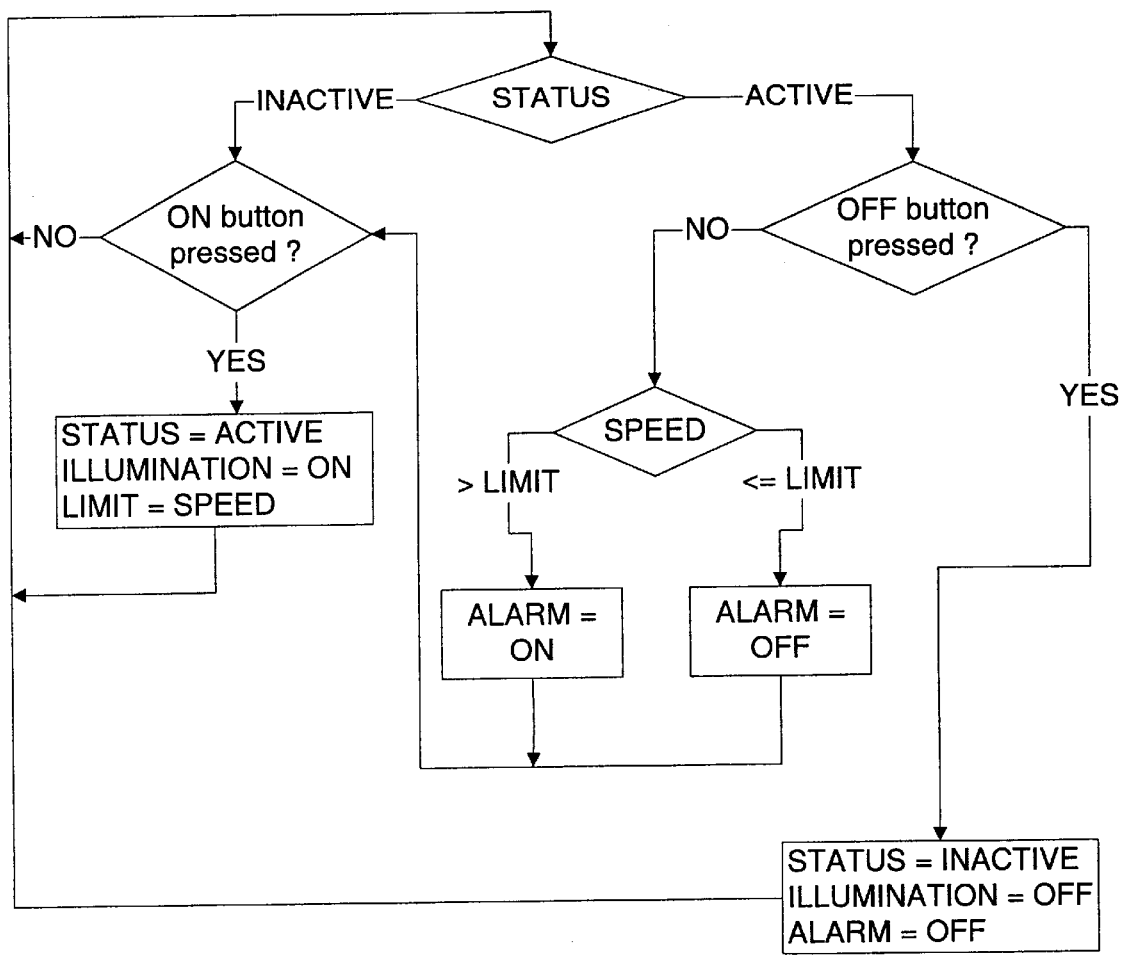
FIG. 4 is a flowchart for the stand-alone warning system of FIG. 3.

A rudimentary alternative overspeed warning system is illustrated conceptually in FIGS. 3 and 4. This system is indicated generally as 70 and retains power supply system 22, a speed sensor, such as sensor 36, an illumination, such as lighting element 50, and an alarm, such as alarm 54. Alternative system 70 includes an alternative speed comparator, in the form of microprocessor 72 having an alternative instruction set according to the logic of FIG. 4. System 70 includes a set of speed warning buttons, one "warning-on" button 74 and one "warning-off" button 76, in lieu of knob 48 and display 52. When the vehicle has reached a certain speed as per speedometer 24, the driver of the vehicle can press the "warning-on" button to arm the system, and at the same time set the speed limit at that particular speed. Optionally, "warning-on" button 74 can be lit, or a light can be illuminated when the system is armed. The system is disarmed when "warning-off" button 76 is pressed, and is also be shut off automatically when the ignition of the vehicle is turned off When the driver of the vehicle wishes to change the speed limit, system 70 can be reset anytime by pressing "warning-off" button 76 first, then, when the vehicle has reached the desired speed, pressing "warning-on" button 74 again to set the new speed limit at that desired speed.

Figure 5:
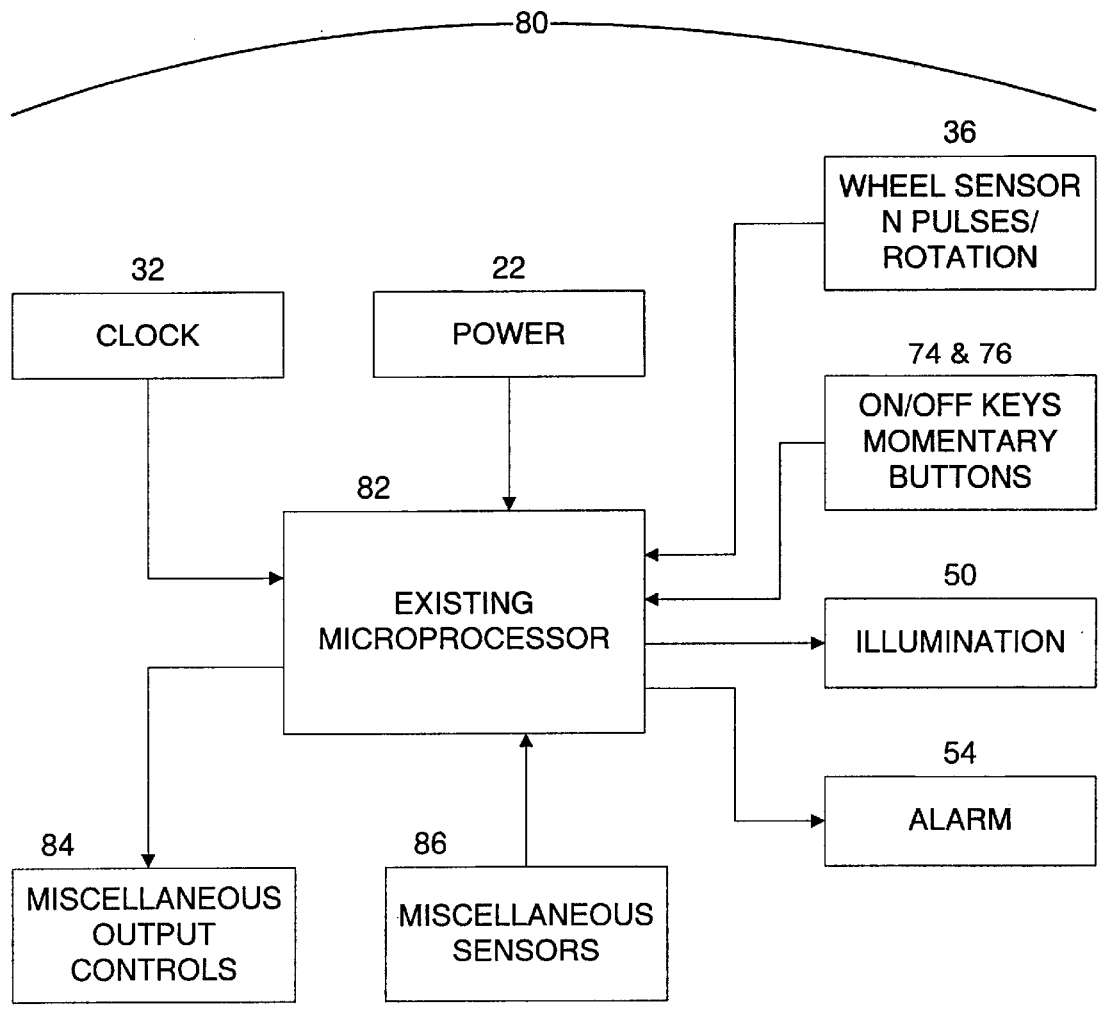
FIG. 5 is an electronic block diagram of a simple, integrated alternative version of the overspeed warning system of FIG. 1.
Figure 6:
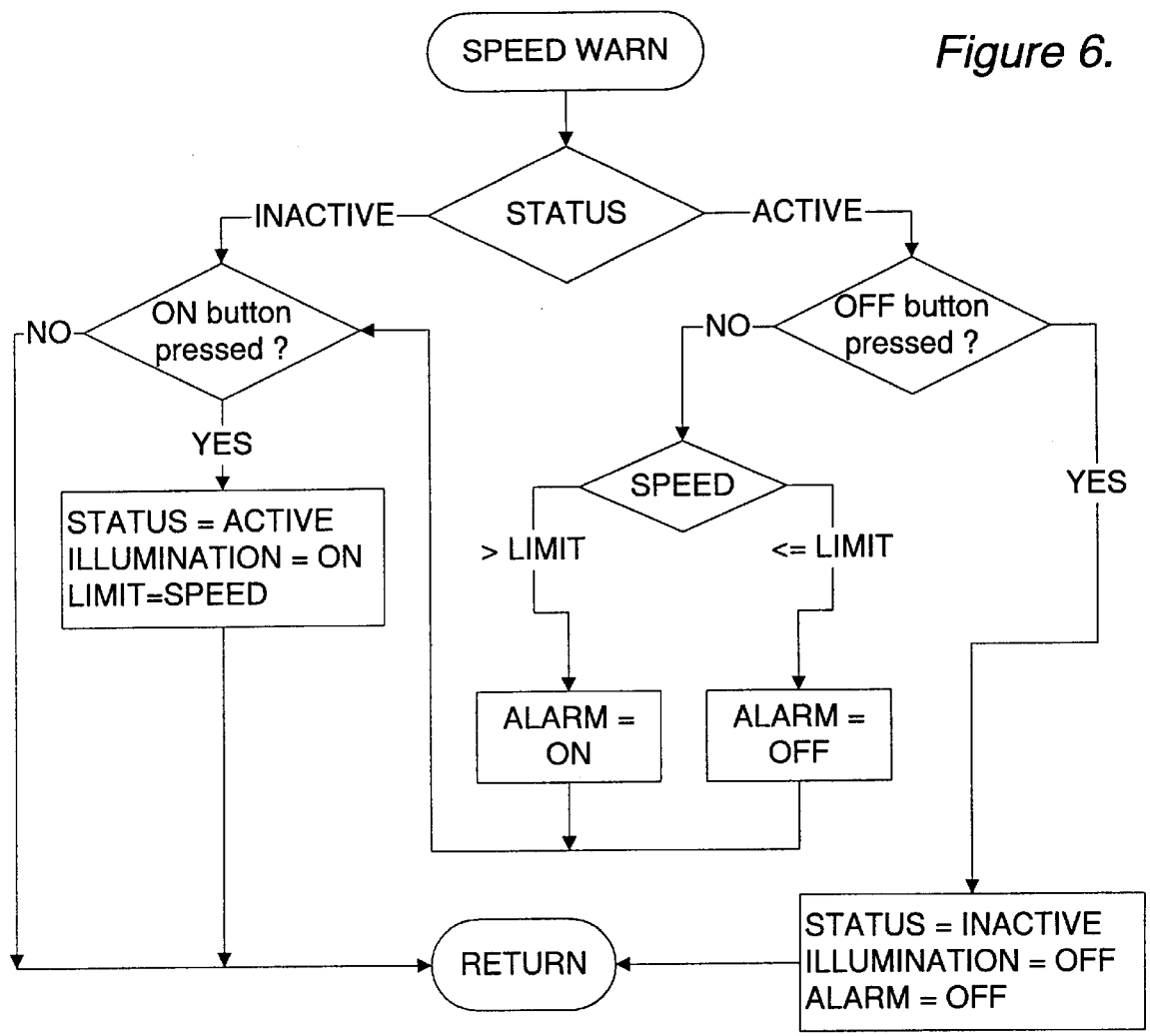
FIG. 6 is a flowchart of the simple, integrated version of FIG. 5.

Similarly, FIG. 5 is an electronic block diagram for, and FIG. 6 is a flowchart of, a simple-integrated version of the same alternative. In a typical electronic car system, several functions can be included in a single microprocessor. The alternative overspeed warning system 80 of FIG. 5, whose flowchart is shown in FIG. 6 does not employ a separate microprocessor, but uses an existing microprocessor 82 and merely provides an overspeed warning subroutine which is called every few milliseconds as part of a main processing loop. System 80 retains the "warning on" and "warning off" buttons, 74 and 76, of the embodiment of FIG. 3 and 4. The remaining elements of this alternative embodiment correspond generally to those of the embodiment of FIGS. 1 and 2, and include power source 22, clock 32, wheel sensor 36, lighting element 50, and alarm 54. Existing electronic system controls, such as warning lights, seat belt buzzers, engine controls, and other similar devices that interact with microprocessor 82 are indicated generally as 84. Similarly, pre-existing electronic system sensors, such as door switches, a tachometer, wheel sensors and other similar devices are indicated generally as 86.

In another alternative, the functions of knob 48 could be separated by providing a distinct "On-Off" switch, and a separate limit calibration device, whether a rotating knob or a set of up-and-down keys by which a limit value may be adjusted incrementally from a datum, or a set of numbered keys by which a specific value may be entered.

It is possible to make other embodiments that employ the principles of the invention and that fall within its spirit and scope. The description is made for the purpose of explanation, and the invention is not to be limited to the embodiments described but only by the claims which follow and by equivalents thereto.

I claim:

1. An automobile overspeed warning system for a passenger car comprising:

a speed sensor for sensing the speed of the automobile;

a speed selector on which an operator may select a warning speed, said speed selector being mountable within reach of the driver of the car, and being operable at any time the motor of the car is running;

a warning speed display connected to show the selected warning speed, said warning speed display being mountable in a location visible to the driver of the car;

a comparator for comparing the speed sensed by said sensor with the warning speed selected with said selector;

a warning annunciator connected to said comparator to give a warning when the speed sensed exceeds the warning speed selected; and said selector includes a knob that is
(a) moveable, at any time, to an "On" position for activating said system, and to an "Off" position for de-activating said system,
(b) operable in said "On" position to select the desired speed,
(c) operable in said "On" position, while the car is in motion, to change the selected speed; and
(d) operable to cause the selected speed to be shown on said warning speed display.

2. The automobile overspeed warning system of claim 1 wherein said annunciator includes at least one of (a) a voice message generator;

(b) a musical message generator; and said warning system is connected to a loudspeaker of an existing audio system of the car whereby said loudspeaker is drivable by said warning system to give the warning.

3. The automobile overspeed warning system of claim 1 wherein said knob is translatable along an axis to activate said system, and rotatable about said axis to select said warning speed; and said knob is operable to change said selected warning speed while the car is in motion.

4. The automobile overspeed warning system of claim 1 wherein said system is in the form of a retro-fit kit.

5. The automobile overspeed warning system of claim 1 wherein said warning system includes a "warning system on" display for indicating when said warning system is "on".

6. The automobile overspeed warning system of claim 5 wherein said "warning system on" display includes an illumination element for illuminating said knob that is lit when said knob is in said "on" position, and said display is mountable adjacent to a speedometer of the car.

7. The combination of the automobile overspeed warning system of claim 1 and a cruise control system for the car, the cruise control system being operable at a selected cruise control speed, said cruise control system being interruptible to become inactive when the car undergoes braking, and said warning system being operable at a selected warning speed higher than the cruise control speed.

8. The combination of claim 7 wherein said automobile warning system and said cruise control share a microprocessor.

9. The combination of claim 7 wherein said annunciator includes at least one of (a) a voice message generator;

(b) a musical message generator; and said warning system is connected to a loudspeaker.

10. The combination of claim 9 wherein said loudspeaker is a loudspeaker of an existing audio system of the car.

11. The combination of claim 7, the car having a speedometer, wherein said annunciator gives an audible warning, said overspeed warning system includes a visible indicator mountable adjacent to the speedometer for informing the driver that said overspeed warning system is activated; and said display is also mountable adjacent to the speedometer.

12. The combination of claim 11 wherein said warning system is connected to at least one of (a) a radio speaker of the car; (b) a speaker of a compact disc player installed in the car; and (c) a speaker of a cassette player installed in the car.

13. The combination of claim 12 wherein said warning system is connected to emit a pre-recorded voice message over said speaker.

* * * * *